United States Patent
McDowell et al.

(10) Patent No.: US 10,991,201 B2
(45) Date of Patent: Apr. 27, 2021

(54) METHOD FOR INTEGRITY MONITORING OF WAGERING INFORMATION AND A SYSTEM THEREFOR

(71) Applicant: FSB Technology (UK) Ltd., London (GB)

(72) Inventors: David Michael McDowell, London (GB); Samuel Brighton Lawrence, London (GB)

(73) Assignee: FSB TECHNOLOGY (UK) LTD., London (GB)

(*) Notice: Subject to any disclaimer, the term of this patent is extended or adjusted under 35 U.S.C. 154(b) by 0 days.

(21) Appl. No.: 16/458,619

(22) Filed: Jul. 1, 2019

(65) Prior Publication Data
US 2020/0005593 A1 Jan. 2, 2020

Related U.S. Application Data

(60) Provisional application No. 62/692,890, filed on Jul. 2, 2018.

(51) Int. Cl.
*G07F 17/32* (2006.01)
*G06N 20/00* (2019.01)
*H04L 29/06* (2006.01)

(52) U.S. Cl.
CPC ......... *G07F 17/3239* (2013.01); *G06N 20/00* (2019.01); *G07F 17/3223* (2013.01); *G07F 17/3241* (2013.01); *G07F 17/3288* (2013.01); *H04L 67/42* (2013.01)

(58) Field of Classification Search
None
See application file for complete search history.

(56) References Cited

U.S. PATENT DOCUMENTS

| 2011/0300917 | A1* | 12/2011 | Hill | G07F 17/3272 463/11 |
| 2013/0196777 | A1* | 8/2013 | Hill | G07F 17/32 463/42 |
| 2015/0038218 | A1* | 2/2015 | Barclay | G07F 17/3237 463/25 |
| 2015/0279155 | A1* | 10/2015 | Chun | G06Q 20/1085 463/25 |
| 2016/0267747 | A1* | 9/2016 | Dengler | G07F 17/3288 |
| 2017/0148276 | A1* | 5/2017 | Russell | G07F 17/3248 |
| 2017/0236372 | A1* | 8/2017 | Bulzacki | G07F 17/32 463/43 |
| 2017/0243438 | A1* | 8/2017 | Merati | G07F 17/3288 |
| 2017/0294075 | A1* | 10/2017 | Frenkel | G07F 17/3211 |
| 2018/0144580 | A1* | 5/2018 | Frenkel | G07F 17/3255 |

(Continued)

Primary Examiner — Seng H Lim
(74) Attorney, Agent, or Firm — Boisbrun Hofman, PLLC

(57) ABSTRACT

The present invention provides an integrity monitoring method and/or system for collecting and monitoring wagering information on at least one selected event, e.g., the actual stakes, odds and potential payouts, and accordingly determine the probability of suspicious betting behavior. The integrity monitoring method and/or system collects wagering information via a communication link from bookmaker operators. The collected wagering information is normalized and converted to a standardized format and subsequently is aggregated and stored in a centralized database, where it is subjected to statistical analysis to determine suspicious betting behavior.

20 Claims, 3 Drawing Sheets

(56) References Cited

U.S. PATENT DOCUMENTS

| | | | |
|---|---|---|---|
| 2018/0247134 A1* | 8/2018 | Bulzacki | A63F 3/00157 |
| 2019/0122492 A1* | 4/2019 | Nguyen | G07F 17/3248 |
| 2019/0164384 A1* | 5/2019 | Soukup | G07F 17/3239 |
| 2019/0180558 A1* | 6/2019 | Merati | H04L 9/0637 |

* cited by examiner

METHOD FOR INTEGRITY MONITORING OF WAGERING INFORMATION AND A SYSTEM THEREFOR

CROSS-REFERENCE TO RELATED APPLICATION

This claims the benefit of U.S. Provisional Application No. 62/692,890 entitled "Method for Integrity Monitoring of Wagering Information and a System Thereof," filed Jul. 2, 2018, which application is incorporated herein by reference.

TECHNICAL FIELD

The present invention generally relates to methods and systems for monitoring the integrity of wagering information relating to wagers placed against the outcome of an event, e.g. sporting event. More specifically, the invention relates to a system and/or a method of integrity monitoring that is based on aggregating wagering information collected across multiple sports betting operators.

BACKGROUND

It is an unfortunate side effect of the sports betting industry that financial gains can be made through corruption in sports. Individual sports athletes are regularly approached and paid (or coerced) to manipulate the outcome of games. Criminals make money by wagering on these events knowing the pre-determined (fixed) outcome.

Integrity monitoring services are being sold to sports organizing bodies who are concerned about keeping corruption out of their sport, but these existing integrity monitoring services are severely flawed. The current state-of-the-art in integrity monitoring today is focussed on looking at the odds that bookmakers are offering on a sporting event and monitoring these odds for significant movements as bookmakers react to corrupt money being wagered on these events. Unfortunately, odds move for various reasons, and most of these reasons have nothing to do with corruption. For example, player injuries or changes in the weather may unexpectedly move the odds offered, thus leading to false positives, whereby clean events look corrupt because the odds have moved.

The current methods for integrity monitoring are also ineffective across in-play betting, where odds monitoring is more difficult to capture in real time, or across any betting markets where bookmakers might offer different betting terms; for example, the number of places that are paid out on an each-way bet. It is often the case that money originating from corrupt activities is wagered in smaller amounts across many bookmakers to help make sure the odds are not moved. This practice leads to a great number of false negatives, whereby corrupt events are treated as clean bets by the current integrity monitoring methods.

Therefore, there is a need for providing an integrity monitoring method and system thereof, which is capable of accurately monitoring wagering activity.

SUMMARY OF THE INVENTION

These and other problems are generally solved or circumvented, and technical advantages are generally achieved, by advantageous embodiments of the present invention directed to apparatuses, methods and systems for monitoring wagering activity so as to identify suspicious betting behaviors.

Furthermore, the present invention addresses the creation of an application program interface (API) capable of collecting wagering data from bookmaker operators, which may be subjected to a range of quantitative analysis techniques, to identify abnormal betting patterns. For example, the quantitative analysis techniques used for analysing the collected wagering information may include, but not limited to, Machine Learning (ML), Artificial Intelligence (A.I), AI Neural Networks, Big Data, and a range of other quantitative analysis techniques known in the art. The proposed invention may be used to process wagering information (or any other type of information) collected from a variety of data sources (e.g., bookmaker operators), which may be connected to the system of the present invention via a communication network.

This aim is achieved according to the invention by providing an integrity wagering monitoring method and a system thereof. According to an aspect of the present invention, an integrity monitoring system for monitoring betting activity in a plurality of betting operator client servers may be provided. Each of the plurality of betting operator client servers comprises a computer system for processing and storing wager data relating to wagers placed on a plurality of events. The integrity monitoring system comprising an integrity monitoring module communicatively coupled to each of the betting operator client servers via a communication network for processing and analysing the wager data stored in each of the plurality of betting operator client servers to determine the integrity of the wagers placed on each event across the plurality of betting operating client servers. The integrity monitoring module comprising a data exchange module for exchanging information via the communication network with each of the plurality of betting operator client servers, a data aggregation module for aggregating wager data received via the communication network from each of the plurality of betting operator clients into at least one wager data-set, and an analysis engine for analysing the at least one wager data-set to assess, based on a set of rules, the integrity of the wagers placed on each event across the plurality of betting operating clients.

The foregoing has outlined rather broadly the features and technical advantages of the present disclosure in order that the detailed description of the disclosure that follows may be better understood. Additional features and advantages of the disclosure will be described hereinafter, which form the subject of the claims of the disclosure. It should be appreciated by those skilled in the art that the conception and specific embodiment disclosed may be readily utilized as a basis for modifying or designing other structures or processes for carrying out the same purposes of the present disclosure. It should also be realized by those skilled in the art that such equivalent constructions do not depart from the spirit and scope of the disclosure as set forth in the appended claims.

BRIEF DESCRIPTION OF THE DRAWINGS

The following drawings are provided as an example to explain further and describe various aspects of the invention.

Corresponding numerals and symbols in the different figures generally refer to corresponding parts unless other-

DETAILED DESCRIPTION

Figure 1:
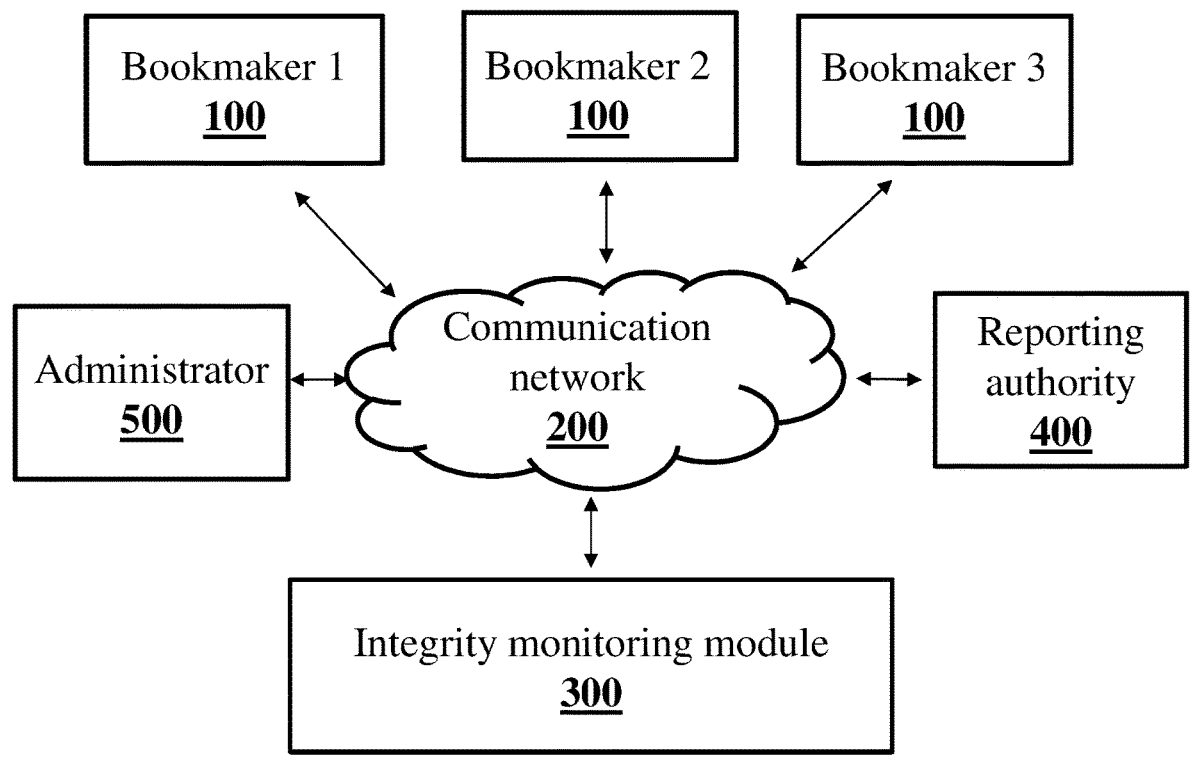
FIGS. 1 and 2 show exemplified implementations of the integrity monitoring system according to the embodiments of the present invention.
Figure 2:
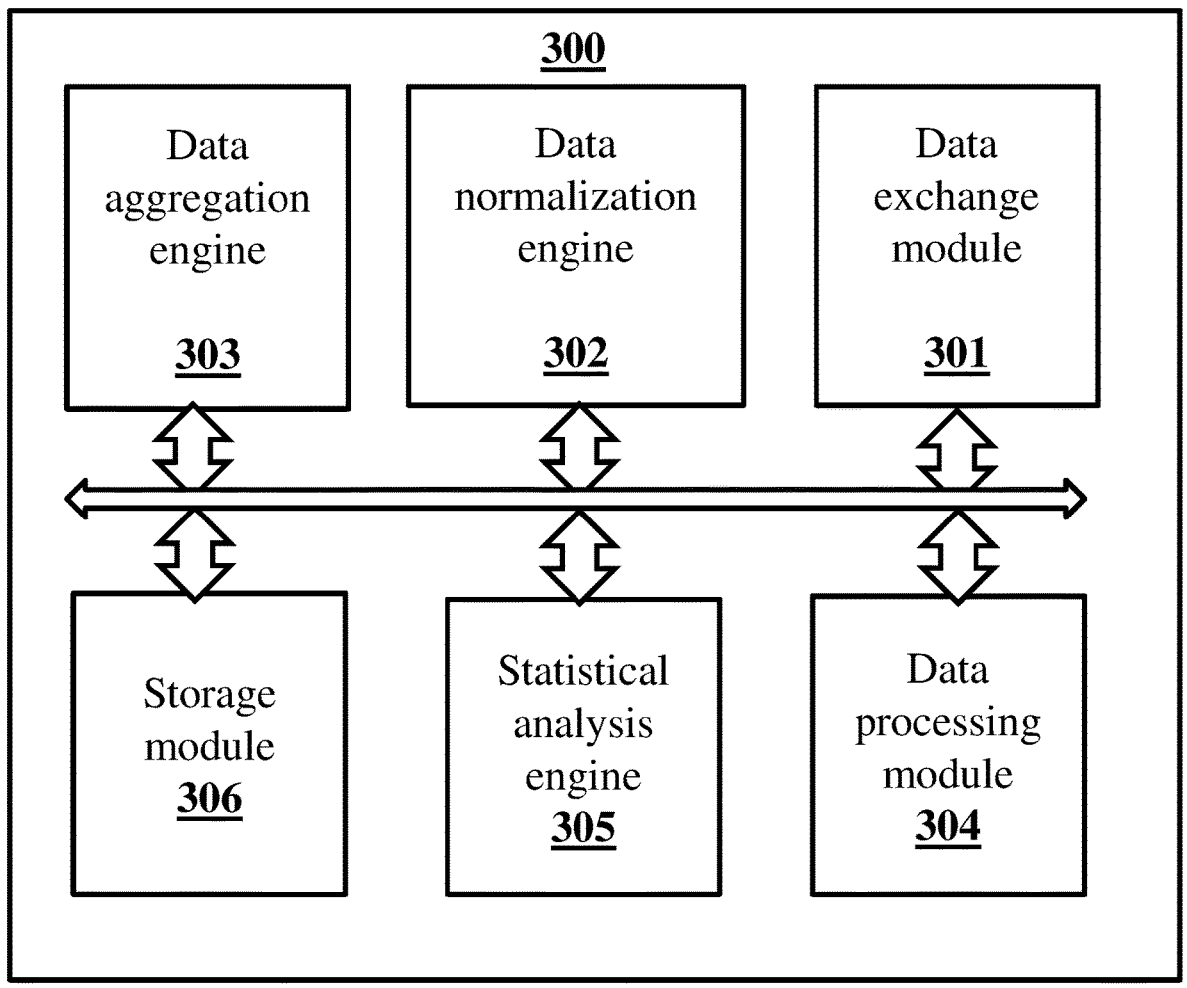
Figure 3:
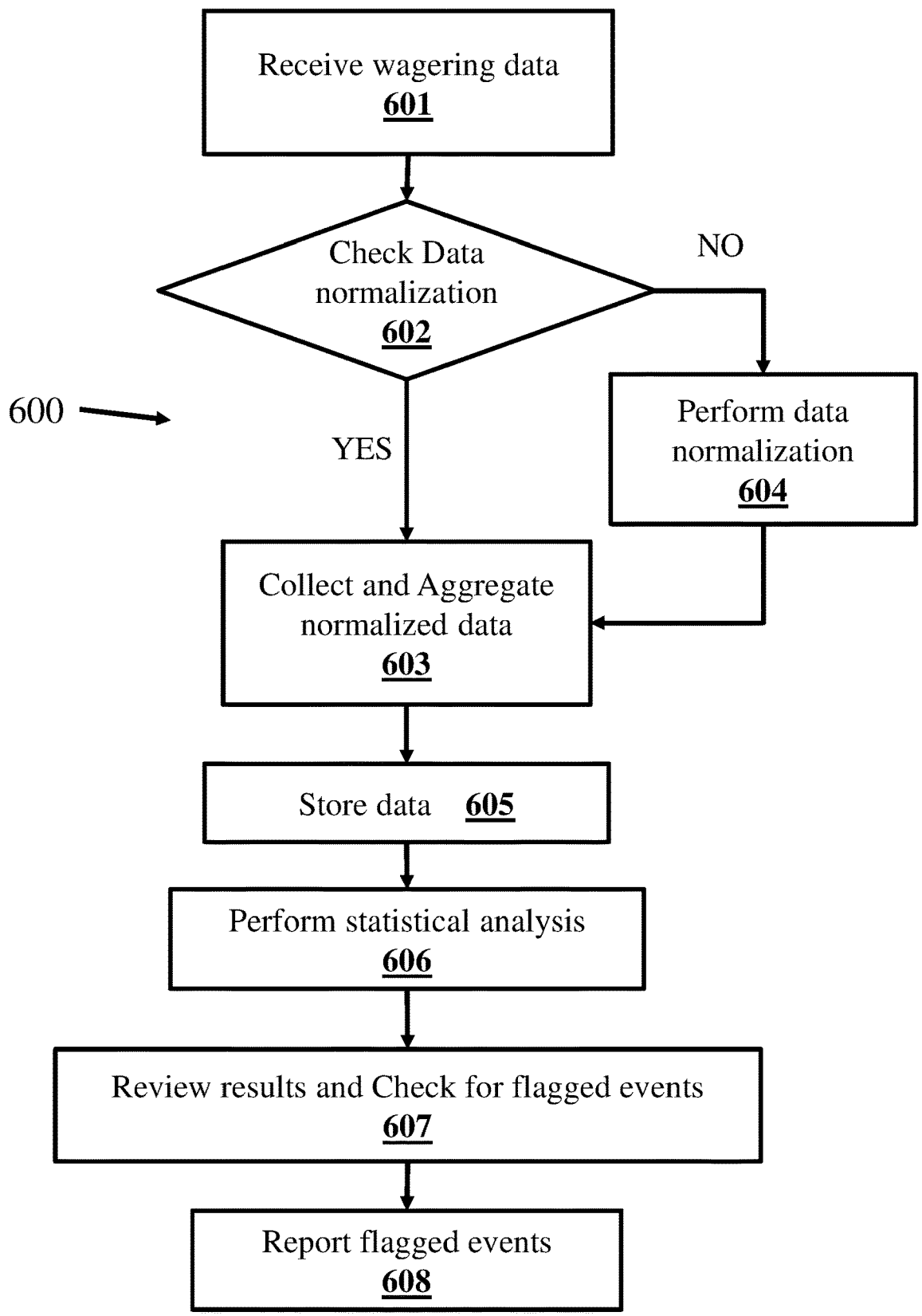
FIG. 3 shows an example of an integrity monitoring method for monitoring wagering information according to embodiments of the present invention.

The present invention will be illustrated using the exemplified embodiments shown in FIGS. 1 to 3. It should be noted that any references made to dimensions are only indicative and do not restrict the invention in any way. While this invention has been shown and described with reference to certain illustrated embodiments thereof, it will be understood by those skilled in the art that various changes in form and details may be made therein without departing from the scope of the invention encompassed by the appended claims. For example, while the invention has been described with references to the use of the integrity monitoring of wagering information, it should be understood by those skilled in the art that changes in form and details may be made to facilitate integrity monitoring of other type of information, e.g., financial transaction information, without departing from the scope of the present invention.

An integrity monitoring method and/or system is provided for collecting and monitoring wagering information on at least one selected event, e.g. the actual stakes, odds and potential payouts, and accordingly determine the probability of suspicious betting behavior. The integrity monitoring method and/or system collects wagering information via a communication link from a plurality of bookmaker operator client servers. The collected wagering information may then be normalized and converted to a standardized format. The collected wagering information, whether in a standardized/normalized format or in a raw format (i.e. in the data format provided by the bookmaker operators), may be subsequently aggregated and stored in a computer readable storage media, where it may be subjected to a range of quantitative analysis techniques to determine suspicious betting behavior. Computer readable storage media may include volatile and non-volatile, and removable and non-removable tangible media implemented in any method or technology for storage of information, such as computer-readable instructions, data structures, program modules, or other data. Computer readable storage media may further include random access memory ("RAM"), read-only memory ("ROM"), erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer.

It has been found that by collecting wagering information directly from bookmaker operators, it is possible to more accurately detect suspicious betting behaviors even when corrupt money have been wagered in smaller amounts across multiple betting operators. The increase in accuracy is due to the statistical analysis being performed on actual wagering information collected directly from bookmaker operator client servers, rather than simply using odds, as it is the case with the known integrity monitoring solutions. Wagering information, which is critical for integrity monitoring, is normally distributed across disparate sources and stored in different formats and, as such, cannot be directly analyzed accurately for integrity monitoring. It has been found that by collecting and aggregating the wagering information directly from the bookmaker operator client servers may improve the accuracy of integrity monitoring services in identifying suspicious betting behavior.

Furthermore, by normalizing the collected wagering information, also referred to as wager data, into a specified data format may ease the analysis of the wagering information. For example, by aggregating and normalizing wagering information collected from different bookmaker operator client servers, it may be possible to collectively assess the integrity of all wagers placed on each event accords the different betting operator platforms, and accordingly determine whether the money wagered on the outcome of an event is the result of a corrupt activity or not. As a result, with the present invention, the quality and accuracy of services relating to monitoring the integrity of wagering information, e.g., integrity monitoring services, may be significantly improved. The present invention accumulates a large quantity of critical data from disparate data sources to improve the quality of integrating monitoring of wagering data compared to the known solutions, which are solely focused on only checking the movement of the odds.

The present invention may improve the quality of integrity monitoring, when compared with the current products on offer, and may be extremely valuable for sports authorities who are looking to prevent corrupt betting behavior, e.g. match-fixing. The present invention may also be valuable for bookmakers who may fall prey to corrupt betting behaviors by paying out winning bets made on corrupt matches. The present invention may provide an independent evaluation and third-party validation on suspicious betting behavior, which can be used as legal justification for voiding the wagers flagged by the integrity monitoring method and/or system as being suspicious. Furthermore, the present invention may provide to police staff concrete and independently evaluated data to identify individual people who are placing suspicious wagers and convict criminals involved with match-fixing.

According to embodiments of the present invention, the integrity monitoring method and/or system would interface with the different bookmaker computer platforms, which are used by the bookmakers to capture wager details. The bookmaker computer platforms may store wagering information in a number of different formats. According to embodiments of the present invention, the wagering information stored in the bookmaker platforms may be standardized to a common format. The standardization of the wagering information may be performed directly by the bookmaker platforms, and/or by the integrity monitoring application, and/or by a $3^{rd}$ party application connected to the integrity monitoring application. For example, the present invention may specify for a common data format to be used by the bookmakers when exchanging wagering information with the integrity-monitoring software application. Transfer of the data from each bookmaker into the integrity monitoring platform of the present invention may be performed using any known data transfer technology known to the skilled person in the art, e.g., File Transfer Protocol (FTP), a direct communication link to the bookmaker servers, and others.

According to embodiments of the present invention, the integrity monitoring method and/or system may provide to the bookmaker platforms a set of reporting keys that each bookmaker may use to identify at least the a) sport, b) competition and c) teams. For example a) the sport may be reported in the form of Football=1, Basketball=2, b) the competition may be reported in the form of NFL=1, NCAA Division 1 football=2, and the teams may be reported in the form of Chicago Bears=1, New York Giants=2. It should be noted that any suitable form known to the skilled person may be used as reporting keys for identifying the wagering data. By using the reporting keys, the wager data may be normalized to a predetermined data structure and/or data format before being stored into a centralized database, thus eliminating concerns with how different betting operators store wager data. For example, a wager on an NFL game between the Bears and Giants may be reported using a set of reporting keys in part as (in addition to a wide range of additional information) sport=1, competition=1 HomeTeam=1, AwayTeam=2, etc. Similar reporting keys may be needed to identify betting markets (for example, "which team will score first") and possible selections (home team, away team).

According to embodiments of the present invention, the integrity monitoring method and/or system may receive the information as text (or in another format) and translate/normalize the data into a common format before inserting the normalized data into a centralized database for analysis. For example, in the case where the wager details are presented in a non-normalized format (e.g. Sport=Football, Competition=NFL, HomeTeam=Bears, AwayTeam=Giants), the integrity monitoring method and/or system would translate the incoming data into the appropriate data keys for analysis.

According to embodiments of the present invention, in addition to information on the sporting event as described above, each wager reported may include other information. For example, the wager reported may include information relating to, but not limited, the betting operator, event time, time stamp (and Time Zone) of the wager placement, location when/where the bet was placed, the betting channel (mobile, web, over-the-counter, self-service terminal), betting staff member identification (ID, where manually accepted), unique machine identifier (the ID of the self-service betting terminal used to place the wager), amount staked, odds, potential winnings and customer details (unique identifier for the customer for any account-based wagering, or anonymous).

According to embodiments of the present invention, various techniques may be used for defining how the data should be structured and put into a file format, how the data file should be sent to the centralized system, how the data is extracted from the file and processed/stored in the centralized system, how the original data file is stored for backup and various methods for analysing the data. For example, analyzing the data may incorporate various techniques, including big data analytics, machine learning, and the like to ensure that any obscure patterns can be identified without the need to manually specify the structure of every different report produced by the system. One of the indicators of an integrity issue may be an abnormally high number of stakes being placed on a sporting event in a particular market when compared to the expected stakes for that market. The expected stakes may be calculated based on historical records or by assessing the market potential using data collected from different sources, e.g., number of unique users placing bets. The system may, after analyzing the data, highlight specific events, betting markets or athletes that appear to be suspicious, which can then be analyzed further or reported to the appropriate authority (crime enforcement, gambling regulator, sports organizing body).

Any suspicious behavior that is flagged will be able to be traced back to individual customers of the betting sites, individual betting shops, individual machines and individual staff members. It is important to point out that the critical information that needs to be collected includes the financial details of every wager, and that all of the other information may not necessarily be available for inclusion depending on technical limitation from each operator. In other words, the integrity monitoring will still work if we do not know the specific staff member ID where the wager was placed, but the ability to assist police investigations in identifying individual people involved in the corruption is reduced.

According to an aspect of the present invention, an integrity monitoring method may be provided for monitoring betting activity in a plurality of betting operator client servers. each of the plurality of betting operator client servers comprises a computer system for processing and storing wager data relating to wagers placed on a plurality of events. The integrity monitoring method comprising receiving wager data from the plurality of betting operator client servers via the communication network, aggregating the wager data into at least one wager data-set, analyzing the at least one wager data-set to assess, based on a set of rules, an integrity of the wagers placed on each event across the plurality of betting operating client servers, and reporting results of the analysis to at least one authorised user via the communication network.

Turning now to FIG. 1, illustrated is an exemplified implementation of an integrity monitoring system according to embodiments of the present invention. The integrity monitoring system includes an integrity-monitoring module 300, connected via a communication network 200 to at least one bookmaker operator computer platform 100 for the exchange of wagering information. As shown in FIG. 1, the integrity monitoring module 300 may be configured for collecting from the bookmaker operator platforms 100 wagering information containing a range of wager details. For example, the wagering information may include, but not limited, the name of the sporting event, the teams, the odds, the bets placed, the identification (ID) of the users placing the bets, the time and time of the bets placed, and other types of information. The bookmaker operator platforms 100 may store the wagering information in a format that is most suitable for their database structure. As a result, it may be the case that different betting operators would report wagering information in different formats, e.g., Extensible Markup Language (XML), Hyper Text Markup Language (HTML), text, and the like.

According to embodiments of the present invention, the integrity-monitoring module 300 may be arranged for providing a set of data reporting keys to the bookmaker operator platforms 100 for reporting wagering information. By using the reporting keys, the wager data may be normalized at each bookmaker operator's computer platform 100, before it is transmitted for processing by the integrity-monitoring module 300. The use of reporting keys may be used to normalize and/or standardize the format of the information transmitted by each bookmaker operator, thus eliminating concerns over different bookmaker operator platforms 100 using different spellings or different acronyms to identify wager information, such as the name of the teams, sport competitions, wager amount, currency, users, and the like. For example, using the reporting keys, a wager on a National Football League (NFL) game between the Bears and Giants may be reported in part as (in addition to a wide range of additional information) sport=1, competition=1 HomeTeam=1, AwayTeam=2, etc. Similar keys may be needed to identify betting markets (for example, "which team will score first") and possible selections (home team, away team). The reporting keys may use three letter codes to refer to the league, e.g. Premier league may be referred to as EPL, and team, e.g., Manchester United may be referred to as MNU. The bookmakers may send data using these reporting keys regardless of how the data is stored in each operator's computer platforms 100. The integrity-monitoring module 300 may also be provided with data normalization capabilities to ensure uniformity in the data being processed. The standardization/normalization of the collected wagering data is an entirely optional step.

The integrity monitoring module 300 may be configured for processing and analysing the collected wagering information in the data format provided by the bookmaker operator. Once the wagering information has been collected and aggregated at the integrity-monitoring module 300, it may be processed and analyzed using a range of techniques to detect possible betting anomalies that may indicate the presence of a corrupt sports fixture. For example, the wagering information, whether in a standardized/normalized format or in a raw format (i.e., in the data format provided by the bookmaker operator platforms 100) may be stored in a computer-readable storage media, e.g., memory. The integrity-monitoring module 300 may use a variety of analysis methods to analyze the stored wagering information.

For example, the integrity-monitoring module 300 may be provided with a big data engine capable of performing big data analytics, an Artificial Intelligence (AI) engine and/or a Machine Learning (ML) engine trained to recognize corrupt betting behavior patterns, and other data analysis and processing techniques known to the skilled person. Once the data is analyzed, it may be reported in a number of different formats via the communication network 200 to at least on authorised users for further analysis, e.g., administrator 500, reporting authority 400, and the like. The at least one authorized user may provide feedback on the results reported, which may be fed back into the data analysis step, resulting in an iterative data analysis process. For example, the integrity-monitoring module 300 may be capable of using data visualization techniques to report the data analysis results to the authorised user. Data visualization techniques may use interactive information displays, e.g., tables and charts, to help communicate key messages contained in the data and allow the users to explore different aspects of the wagering information.

For example, the results may be reported in the form of interactive tables and/or charts, thus allowing the users to change the data granularity. Once the data analysis is completed, the reporting results may contain a number of fixtures, which have been flagged as suspicious. The flagged fixtures may be reported via the communication network 200 back to the bookmaker operator platforms 100 and/or a reporting authority 400. At this instance, certain actions may be initiated for the further investigation of the flagged events. For example, the names of the individual users that have placed bets in the flagged fixtures may be cross-checked against a criminal record database to identify potential links with corrupt organizations and/or previous activity in match-fixing.

According to embodiments of the present invention, the communication network 200 is capable of communicating data between local and/or remote client servers in a variety of electronic data formats. The communication network 200 may be implemented in any form known to the skilled person in the art.

Referring now to FIG. 2, illustrated is an exemplified implementation of the integrity-monitoring module 300 according to embodiments of the present invention. As shown, the integrity-monitoring module 300 may be provided with a data exchange module 301, which is configured for exchanging data via the communication network 200 with different connected client servers, e.g., bookmaker operator's platforms 100, administrator 500, and reporting authority 400. A data normalization module 302 may be provided for checking whether the received wagering information has been structured according to the reporting keys, i.e., the wagering information is in a predetermined data structure and/or format. In the case where the wager data received from the booking operators is in a different format than the one indicated by the reporting keys, the data normalization module 302 converts the received wagering information to the desired normalized data structure and/or data format. The normalized data received from the different bookmaker operators may be aggregated into a data set with the use of a data aggregation engine 303, which may be subsequently stored in a computer storage module 306. A data processing module 304 may be used to retrieve, and/or transform, and/or classify the normalized information, and generally prepare the normalized data for analysis.

For example, the data processing engine 304 may classify the wager data in the data-set according to a set of classification rules such as the type of betting event, amount, market, and the like. The data analysis may be carried out using an analysis engine 305, which may use a variety of techniques, e.g., Big Data, Artificial Intelligence (AI), Machine Learning (ML) and the like to determine suspicious betting behavior. The analysis engine 305 may be configured for assessing the integrity of each wager placed on an event across the different betting operators by comparing the aggregated wager data associated with each event to a corresponding set of reference wager integrity data stored in a reference wager database. For example, the statistical analysis may call upon historical betting data, provided from a variety of sources (e.g., bookmaker operators), to compare the betting stakes-placed on each event to determine suspicious betting behavior.

The statistical analysis engine 305 may also use external information, e.g., criminal record database, to determine possible users linked to criminal activities that may justify the betting anomalies detected. The analysis engine 305 may be provided with a statistical module for calculating, based on the results of the comparison, an integrity score for each event indicating the probability of corrupt betting behavior. The analysis engine 305 may be provided with a big data engine capable of performing big data analytics on the at least one wager data-set to identify patterns of suspicious betting behavior across the plurality of betting operator clients. The analysis engine 305 may be configured for identifying patterns in the wager data associated with each event corresponding to reference patterns associated with corrupt betting behavior. The reference patterns may be stored in the integrity monitoring module 300 and or provided from a third-party provider.

Furthermore, the analysis engine 305 may be provided with an Artificial Intelligence engine trained on a set of reference patterns associated with corrupt betting behavior. The results of the statistical analysis may be reported back to the at least one authorized user, e.g., the administrator 500, bookmaker operators platforms 100, and reporting authority 400, for further processing. The analysis engine 305 is configured for reporting the results of the analysis to at least one authorized user via the communication network. For example, the analysis engine 305 may be provided with a front-end module comprising a Graphic User Interface (GUI) for visualizing the results of the analysis into a selected format. The front-end module may be configured for interacting with the at least one authorized user via the communication network. For example, the authorized user may access the results via a software application or a dedicated website hosting the front-end of integrity monitoring computer platform implemented according to embodiments of the present invention.

Referring now to FIG. 3, illustrated is an exemplified integrity-monitoring method 600 for monitoring the integrity of wagering information. The method 600 may be implemented in the form of an executable computer readable program stored in the memory of a computer processing system, which when executed, causes the system to perform a series of actions. As shown in FIG. 3, once the wagering data has been received in step 601, it is checked in step 602 to determine if the wagering data has been normalized. If the data is normalized, it is aggregated in step 603, together with wagering information received from other bookmaker operators, into a data set. However, if the data has not been normalized, it is transferred to step 604, where it is converted to the desired structure format before being aggregated in step 603. Once the wagering data set from all the participating bookmaker operators has been aggregated, it is stored in step 605. Once stored, the wagering data is subjected, at step 606, to a statistical analysis using a variety of techniques as previously discussed. The results from the statistical analysis are reviewed and check for flagged events in step 607, e.g., an authorized user (administrator 500) and/or a specific module of the system (AI engine), and any events flagged as suspicious are reported to a designated user in step 608, e.g., reporting authority 400, and/or administrator 500, and/or bookmaker operators 100.

In general, the routines executed to implement the embodiments of the invention, whether implemented as part of an operating system or a specific application, component, program, object, module or sequence of instructions, or even a subset thereof, may be referred to herein as "computer program code," or simply "program code." The program code typically comprises computer readable instructions that are resident at various times in various memory and storage devices in a computer and that, when read and executed by one or more processors in a computer, cause that computer to perform the operations necessary to execute operations and/or elements embodying the various aspects of the embodiments of the invention. The computer readable program instructions for carrying out operations of the embodiments of the invention may be, for example, assembly language or either source code or object code is written in any combination of one or more programming languages.

The program code embodied in any of the applications/modules described herein is capable of being individually or collectively distributed as a program product in a variety of different forms. In particular, the program code may be distributed using a computer readable storage medium having computer readable program instructions thereon for causing a processor to carry out aspects of the embodiments of the invention.

Computer readable storage media, which is inherently non-transitory, may include volatile and non-volatile, and removable and non-removable tangible media implemented in any method or technology for storage of information, such as computer-readable instructions, data structures, program modules, or other data. Computer readable storage media may further include random access memory (RAM), read-only memory (ROM), erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. A computer-readable storage medium should not be construed as transitory signals per se (e.g., radio waves or other propagating electromagnetic waves, electromagnetic waves propagating through a transmission media such as a waveguide, or electrical signals transmitted through a wire). Computer readable program instructions may be downloaded to a computer, another type of programmable data processing apparatus, or another device from a computer-readable storage medium or an external computer or external storage device via a network.

Computer readable program instructions stored in a computer-readable medium may be used to direct a computer, other types of programmable data processing apparatus, or other devices to function in a particular manner, such that the instructions stored in the computer-readable medium produce an article of manufacture including instructions that implement the functions/acts specified in the flowcharts, sequence diagrams, and/or block diagrams. The computer program instructions may be provided to one or more processors of a general-purpose computer, special purpose computer, or other programmable data processing apparatus to produce a machine, such that the instructions, which execute via the one or more processors, cause a series of computations to be performed to implement the functions and/or acts specified in the flowcharts, sequence diagrams, and/or block diagrams.

In certain alternative embodiments, the functions and/or acts specified in the flowcharts, sequence diagrams, and/or block diagrams may be re-ordered, processed serially, and/or processed concurrently without departing from the scope of the invention. Moreover, any of the flowcharts, sequence diagrams, and/or block diagrams may include more or fewer blocks than those illustrated consistent with embodiments of the invention.

The terminology used herein is for the purpose of describing particular embodiments only and is not intended to be limiting of the embodiments of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Furthermore, to the extent that the terms "includes", "having", "has", "with", "comprised of", or variants thereof are used in either the detailed description or the claims, such terms are intended to be inclusive in a manner similar to the term "comprising".

While all of the inventions have been illustrated by a description of various embodiments and while these embodiments have been described in considerable detail, it is not the intention of the Applicant to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the spirit or scope of the Applicant's general inventive concept.

The invention claimed is:

1. An integrity monitoring system for monitoring betting activity in a plurality of betting operator client servers, each of the plurality of betting operator client servers comprising a computer system for processing and storing wager data relating to wagers placed on a plurality of events, the plurality of events being external to the integrity monitoring system and the plurality of betting operator client servers, and the wagers being placed by non-participating betting operator clients, the integrity monitoring system comprising:
- an integrity monitoring module communicatively coupled to each of the plurality of betting operator client servers via a communication network for processing and analyzing the wager data stored in each of the plurality of betting operator client servers to determine an integrity of the wagers placed on each event across the plurality of betting operating client servers, the integrity monitoring module comprising
  - a data exchange module for exchanging information via the communication network with each of the plurality of betting operator client servers;
  - a data aggregation module for aggregating the wager data received via the communication network from each of the plurality of betting operator client servers into at least one wager data-set; and
  - an analysis engine for analyzing the at least one wager data-set to assess, based on a set of rules, the integrity of the wagers placed on each event across the plurality of betting operator client servers by monitoring the wager data on each event to determine a probability of suspicious betting behavior by the non-participating betting operator clients.

2. The integrity monitoring system of claim 1, wherein the analysis engine is configured for reporting results of the analysis to at least one authorized user via the communication network.

3. The integrity monitoring system of claim 1, wherein the analysis engine comprises a front-end module comprising a Graphic User Interface (GUI) for visualizing results of the analysis into a selected format.

4. The integrity monitoring system of claim 3, wherein the front-end module is configured for interacting with at least one authorised user via the communication network.

5. The integrity monitoring system of claim 1, wherein assessing the integrity of each wager involves comparing the aggregated wager data associated with each event to a corresponding set of reference wager integrity data stored in a reference wager database.

6. The integrity monitoring system of claim 5, wherein the analysis engine comprises a statistical module for calculating, based on the results of the comparison, an integrity score for each event indicating the probability of suspicious betting behavior.

7. The integrity monitoring system of claim 1, wherein the analysis engine comprises a big data engine capable of performing big data analytics on the at least one wager data-set to identify patterns of suspicious betting behavior across the plurality of nonparticipating betting operator clients.

8. The integrity monitoring system of claim 1, wherein the analysis engine is configured for identifying patterns in the wager data associated with each event corresponding to reference patterns associated with suspicious betting behavior.

9. The integrity monitoring system of claim 1, wherein the analysis engine comprises an Artificial Intelligence engine trained on a set of reference patterns associated with suspicious betting behavior.

10. The integrity monitoring system of claim 1, wherein the data exchange module is configured for transmitting to each of the plurality of betting operator client servers a predetermine set of reporting keys specifying to the plurality of betting operator client servers a data structure for reporting the wager data.

11. The integrity monitoring system of claim 10, wherein the data exchange module comprises a data normalization engine for comparing the data structure of the wager data transmitted by each of the plurality of betting operator client servers to the data structure defined by the set of reporting keys.

12. The integrity monitoring system of claim 10, wherein the data exchange module comprises a data normalization engine configured, when detecting wager data having a different data structure than the one defined by the reporting keys, for converting the data structure into the data structure defined by the set of reporting keys.

13. The integrity monitoring system of claim 1, wherein the data aggregation module comprises a data processing module for classifying the wager data in the at least one wager data-set according to a set of classification rules.

14. The integrity monitoring system of claim 1, wherein the integrity monitoring module is the form of an Application Programming Interface (API).

15. A method of operating an integrity monitoring system for monitoring betting activity in a plurality of betting operator client servers, each of the plurality of betting operator client servers comprising a computer system for processing and storing wager data relating to wagers placed on a plurality of events, the plurality of events being external to the integrity monitoring system and the plurality of betting operator client servers, and the wagers being placed by non-participating betting operator clients, the integrity monitoring method comprising:
- receiving the wager data from the plurality of betting operator client servers via a communication network;
- aggregating the wager data into at least one wager data-set;
- analyzing the at least one wager data-set to assess, based on a set of rules, an integrity of the wagers placed on each event across the plurality of betting operator client servers by monitoring the wager data on each event to determine a probability of suspicious betting behavior by the non-participating betting operator clients; and
- reporting results of the analysis to at least one authorised user via the communication network.

16. The method of claim 15, wherein the step of receiving the wager data comprises the step of assessing a data structure of the wager data received.

17. The method of claim 15, wherein the step of receiving the wager data comprises the step of normalizing a data structure of the wager data received to a selected data structure.

18. An integrity monitoring system for monitoring betting activity in a plurality of betting operator client servers, each of the plurality of betting operator client servers comprising a computer system for processing and storing wager data relating to wagers placed on a plurality of events, the plurality of events being external to the integrity monitoring system and the plurality of betting operator client servers, and the wagers being placed by non-participating betting operator clients, the integrity monitoring system, comprising:
- a processor configured to:
  - receive the wager data from the plurality of betting operator client servers via a communication network;
  - aggregate the wager data into at least one wager data-set;

analyze the at least one wager data-set to assess, based on a set of rules, an integrity of the wagers placed on each event across the plurality of betting operator client servers by monitoring the wager data on each event to determine a probability of suspicious betting behavior by the non-participating betting operator clients; and report results of the analysis to at least one authorised user via the communication network.

19. The integrity monitoring system of claim 18, wherein the processing in accordance with receiving the wager data is configured to assess a data structure of the wager data received.

20. The integrity monitoring system of claim 18, wherein the processing in accordance with receiving the wager data is configured to normalize a data structure of the wager data received to a selected data structure.

* * * * *